United States Patent
Drummond et al.

(10) Patent No.: US 12,455,015 B2
(45) Date of Patent: Oct. 28, 2025

(54) WATER TREATMENT CONTROLLER HOUSING WITH BACKPLATE MOUNT

(71) Applicant: Franklin Fueling Systems, LLC, Madison, WI (US)

(72) Inventors: Bryan D. Drummond, Bluffton, IN (US); Zachary K. Foster, Spencerville, IN (US); Adrian Chavis, Fort Wayne, IN (US)

(73) Assignee: Franklin Fueling Systems, LLC, Madison, WI (US)

(*) Notice: Subject to any disclaimer, the term of this patent is extended or adjusted under 35 U.S.C. 154(b) by 95 days.

(21) Appl. No.: 18/374,909

(22) Filed: Sep. 29, 2023

(65) Prior Publication Data

US 2025/0110513 A1 Apr. 3, 2025

(51) Int. Cl.
*F16K 27/04* (2006.01)
*F16K 31/02* (2006.01)
*F16K 31/52* (2006.01)
*F16K 31/53* (2006.01)
*F16K 27/02* (2006.01)
*G05D 7/06* (2006.01)

(52) U.S. Cl.
CPC .............. *F16K 27/04* (2013.01); *F16K 31/02* (2013.01); *F16K 31/52* (2013.01); *F16K 31/53* (2013.01); *F16K 27/02* (2013.01); *G05D 7/0617* (2013.01)

(58) Field of Classification Search
USPC ....... 210/138, 140–143, 662, 670, 190, 278; 251/315.1; 137/624.21, 625.65, 624.14
See application file for complete search history.

(56) References Cited

U.S. PATENT DOCUMENTS

| | | | | |
|---|---|---|---|---|
| 4,426,294 A | * | 1/1984 | Seal | B01J 49/85 210/662 |
| 5,590,687 A | * | 1/1997 | Vaughan | C02F 1/42 137/624.13 |
| 5,628,899 A | * | 5/1997 | Vaughan | C02F 1/42 137/625.46 |
| 6,402,944 B1 | * | 6/2002 | Vaughan | F16J 15/102 137/625.69 |
| 6,444,127 B1 | * | 9/2002 | Vaughan | F16K 31/046 137/554 |
| 8,500,999 B2 | * | 8/2013 | Tischendorf | C02F 5/00 210/97 |
| 8,529,768 B2 | * | 9/2013 | Chandler, Jr. | C02F 1/42 210/687 |
| 8,945,384 B2 | * | 2/2015 | Gruett | B01J 49/85 210/275 |
| 8,961,797 B2 | * | 2/2015 | Vaughan | F16K 3/08 210/138 |
| 9,758,387 B2 | * | 9/2017 | Gruett | B01J 49/85 |

* cited by examiner

*Primary Examiner* — Matthew W Jellett
(74) *Attorney, Agent, or Firm* — Faegre Drinker Biddle & Reath LLP (57) ABSTRACT

A controller for a fluid treatment control valve having a valve body with a seal stack positioned therein is provided. The controller includes a front housing, a rear housing removably connected to the front housing to define a substantially enclosed volume, a gear box mounted within the substantially enclosed volume, and a circuit board assembly mounted within the substantially enclosed volume. The rear housing includes a first pair of retention elements configured to mate with a corresponding second pair of retention elements on the valve body to mount the controller to the valve body.

26 Claims, 10 Drawing Sheets

WATER TREATMENT CONTROLLER HOUSING WITH BACKPLATE MOUNT

FIELD

The present disclosure pertains to control valves for water treatment systems and more particularly to a control valve with a controller that is quickly, easily and safely removed from and attached to the valve body of the control valve.

BACKGROUND

Control valves for water softeners and iron filters include several moving parts which may require periodic maintenance. In many applications, a control piston moves to different positions within a seal stack positioned inside the control valve to define different fluid flow passageways that permit the various operational modes of the valve body (e.g., service, regeneration, backwash, etc.). Over time, this movement causes wear of the seal stack necessitating its replacement.

Conventionally, the movement of the piston and various other functions of the control valve are controlled by a controller mounted to the valve body. In many systems, the controller must be removed to access the piston and the seal stack. The removal of the controller may be a complicated, time-consuming operation, which may result in damage to various components of the controller (e.g., the electronics housed inside) and/or the valve body. The time required to disassemble the controller from and reassemble the controller to the valve body to replace the seal stack translates into increased operation costs because typically a maintenance person is paid to perform the operation.

Accordingly, it is desirable to provide a control valve including a valve body and a controller which permits the controller to be quickly, easily and safely removed from and attached to the valve body to facilitate replacement of the seal stack.

SUMMARY

According to one embodiment, the present disclosure provides a controller for a fluid treatment control valve having a valve body with a seal stack positioned therein, the controller comprising: a front housing; a rear housing removably connected to the front housing to define a substantially enclosed volume; a gear box mounted within the substantially enclosed volume; and a circuit board assembly mounted within the substantially enclosed volume; wherein the rear housing includes a first pair of retention elements configured to mate with a corresponding second pair of retention elements on the valve body to mount the controller to the valve body. In one aspect of this embodiment, the rear housing further includes a central opening sized to receive a drive gear of the valve body. A variant of this aspect further comprises a control gear driven by the gear box and configured to engage the drive gear when the controller is mounted to the valve body. In another aspect, the first pair of retention elements is a pair of connection snaps, and the second pair of retention elements is a pair of mounting tabs. In a variant of this aspect, each connection snap includes a body that extends substantially perpendicularly from a rear wall of the rear housing, a cam configured to engage one of the pair of mounting tabs to cause the connection snap to flex from an unflexed state to a flexed state, and a catch surface that engages a rear edge of the one of the pair of mounting tabs when the controller is mounted to the valve body and the connection snap moves to the unflexed state. In a further variant, each connection snap includes a first alignment guide element and each mounting tab includes a second alignment guide element that mates with the first alignment guide element. In a still further variant, the first alignment guide element is a groove and the second alignment guide element is a ridge. In yet another variant, the rear housing further includes a pair of over-extension walls positioned adjacent the pair of connection snaps, each over-extension wall providing a stop that prevents the adjacent connection snap from over-extending. Another aspect of this embodiment further comprises a membrane switch assembly including a body with a plurality of buttons, the front housing including a switch recess sized to receive the body of the membrane switch assembly. In a variant of this aspect, the circuit board assembly includes a display mounted to a printed circuit board, the display being visible through an opening in the switch recess and a transparent portion of the body of the membrane switch assembly. In yet another aspect of this embodiment, the rear housing includes a gear box housing configured to receive the gear box. In another aspect, the front housing includes a rear edge and a pair of retaining tabs and the rear housing includes a front edge and a pair of retaining recesses, the front housing being connected to the rear housing by placing the pair of retaining tabs into the pair of retaining recesses, thereby positioning the rear edge of the front housing into engagement with the front edge of the rear housing.

According to another embodiment, the present disclosure provides a control valve for a fluid treatment system, comprising: a valve body with a seal stack and a gear piston assembly positioned therein, the valve body having a mounting flange with a pair of mounting tabs; and a controller including a circuit board assembly and a gear box for controlling operation of the gear piston assembly to move a piston of the gear piston assembly within the seal stack, the circuit board assembly and the gear box being housed within a housing of the controller, the housing including a pair of connection snaps positioned to align with the mounting tabs; wherein the controller is removable from the valve body by flexing the connection snaps away from one another to disengage the connection snaps from the mounting tabs, thereby exposing the gear piston assembly to facilitate replacement of the seal stack. In one aspect of this embodiment, the housing includes a front housing and a rear housing, the connection snaps extending rearwardly from the rear housing. In a variant of this aspect, the rear housing includes a central opening sized to receive a drive gear of the gear piston assembly. In another variant, the controller further includes a control gear driven by the gear box and configured to engage the drive gear when the controller is mounted to the valve body. In another aspect of this embodiment, each connection snap includes a body that extends substantially perpendicularly from a rear wall of the housing, a cam configured to engage one of the pair of mounting tabs to cause the connection snap to flex from an unflexed state to a flexed state, and a catch surface that engages a rear edge of the one of the pair of mounting tabs when the controller is mounted to the valve body and the connection snap moves to the unflexed state. In another aspect, each connection snap includes a first alignment guide element and each mounting tab includes a second alignment guide element that mates with the first alignment guide element. In a variant of this aspect, the first alignment guide element is a groove and the second alignment guide element is a ridge. In another aspect, the housing further includes a pair of over-extension walls positioned adjacent the pair of connection snaps, each over-extension wall providing a stop that prevents the adjacent connection snap from over-extending. In yet another aspect, the controller further includes a membrane switch assembly including a body with a plurality of buttons and the housing includes a switch recess sized to receive the body of the membrane switch assembly. In a variant of this aspect, the circuit board assembly includes a display mounted to a printed circuit board, the display being visible through an opening in the switch recess and a transparent portion of the body of the membrane switch assembly. In another aspect, the housing includes a front housing coupled to a rear housing, the front housing including a rear edge and a pair of retaining tabs and the rear housing including a front edge and a pair of retaining recesses, the front housing being connected to the rear housing by placing the pair of retaining tabs into the pair of retaining recesses, thereby positioning the rear edge of the front housing into engagement with the front edge of the rear housing.

According to yet another embodiment, the present disclosure provides a method of replacing a seal stack of a water treatment system including a valve body, a controller, a flow meter, and a gear piston assembly, the method comprising: disconnecting the flow meter; disengaging connection snaps on a housing of the controller from mounting tabs on a mounting flange of the valve body; moving the controller laterally away from the mounting flange; removing the gear piston assembly and the seal stack from the valve body; installing a replacement seal stack in the valve body and re-installing the gear piston assembly; aligning alignment guide elements of the connection snaps with alignment guide elements of the mounting tabs; moving the controller laterally toward the mounting flange; and reconnecting the flow meter.

BRIEF DESCRIPTION OF THE DRAWINGS

The above-mentioned and other advantages and objects of this disclosure, and the manner of attaining them, will become more apparent, and the disclosure itself will be better understood, by reference to the following description of embodiments of the invention taken in conjunction with the accompanying drawings, wherein.

Corresponding reference characters indicate corresponding parts throughout the several views. Although the drawings represent embodiments of the present disclosure, the drawings are not necessarily to scale, and certain features may be exaggerated or omitted in some of the drawings in order to better illustrate and explain the present disclosure.

DETAILED DESCRIPTION

As is discussed in much greater detail below, the present disclosure provides a controller that can be quickly, easily and safely removed from and attached to a valve body to facilitate replacement of the controller and/or replacement of the seal stack. In one embodiment, the controller is provided with a pair of retention elements and a mounting flange of the valve body is provided with a corresponding pair of retention elements. FIG. 5B shows such an embodiment. The retention elements on the controller 14 are in the form of connection snaps 76 and the retention elements on the mounting flange 28 are in the form of mounting tabs 122. The connection snaps 76 extend from the rear of the controller 14 and each include a cam 82, a catch surface 83 and a groove 84 that extends the length of the connection snap 76. The mounting tabs 122 extend rearwardly from the mounting flange 28 and each include a ridge 128 and a rear edge 126. The controller 14 is attached to the mounting flange 28 by aligning the grooves 84 of the connection snaps 76 with the ridges 128 of the mounting tabs 122 and moving the controller 14 laterally toward the mounting flange 28. The cams 82 of the connection snaps 76 engage the mounting flange 28, causing the connection snaps 76 to flex outwardly (i.e., away from one another) from an unflexed state to a flexed state as the snaps 76 move farther over the mounting tabs 122. When the catch surfaces 83 of the connection snaps 76 reach the rear edges 126 of the mounting tabs 122, the connection snaps 76 snap back to their original unflexed state. Engagement between the catch surfaces 83 of the connection snaps 76 and the rear edges 126 of the mounting tabs 122 retains the controller 14 in place. The controller 14 is detached from the mounting flange 28 by flexing the connection snaps 76 away from each other and moving the controller 14 laterally away from the mounting flange 28. Further detail of this structure and its use is provided below.

Referring now to FIGS. 1-4, a control valve 10 according to one embodiment of the present disclosure is shown. In the remainder of this description the control valve 10 is described as used in a water softener application. It should be understood, however, that the control valve 10 may also be used in well water iron treatment systems and other fluid treatment applications. The control valve 10 generally includes a valve body 12 and a controller 14. The valve body 12 includes a fluid inlet 16, a fluid outlet 18, an injector assembly 20, a brine port 22, a drain 24, a tank connection 26 and a mounting flange 28. The valve body 12 is typically mounted to the top of a resin tank (not shown) containing resin bed for water treatment. Untreated water is delivered to the valve body 12 through the fluid inlet 16 and passed through the valve body 12 to the tank through the tank connection 26. After flowing through the resin bed in the tank, the treated fluid is passed back through the valve body 12 and through the fluid outlet 18 for delivery to various faucets, taps, shower heads, and/or appliances throughout the home or other facility. The injector assembly 20 facilitates regeneration of the resin in the tank by drawing a brine solution from a brine tank (not shown) connected to the brine port 22 and delivering it to the tank where its sodium or potassium ions are exchanged for the hardness mineral ions in the resin. The mineral rich brine solution then flows back up to the valve body 12 and is discharged through the drain 24, which is normally connected through plumbing to a drain in the floor of the home or other facility. It should be understood that the valve body 12 includes a variety of other components that are not described to simplify this description. The mounting flange 28 is configured to connect to the controller 14 as is further described below.

Still referring to FIGS. 1-4, the controller 14 generally includes a front housing 30 and a rear housing 32. In certain embodiments, the front housing 30 and the rear housing 32 are formed by injection molding a plastic material. In other embodiments, the housings 30, 32 may be formed using a different process and different materials. The front housing 30 includes a circuit board assembly 34 and a membrane switch assembly 36 in addition to a plurality of other components as is further described below. The front housing 30 includes a top wall 38, a bottom wall 40, a first side wall 42, a second side wall 44, a front wall 46 and a rear edge 48 formed by the top wall 38, the bottom wall 40, and the side walls 42, 44. Internal components of the front housing 30 are described below. The top wall 38, the bottom wall 40, the side walls 42, 44 and the front wall 46 generally form a partial enclosure that houses the internal components. The side walls 42, 44 each include a retaining tab 50 for connecting the front housing 30 to the rear housing 32 as is further described below. The front wall 46 includes a central portion 52, which in this embodiment protrudes somewhat from the remaining parts of the front wall 46. The central portion 52 includes a switch recess 54 for receiving the membrane switch assembly 36 as is also further described below.

Figure 4:
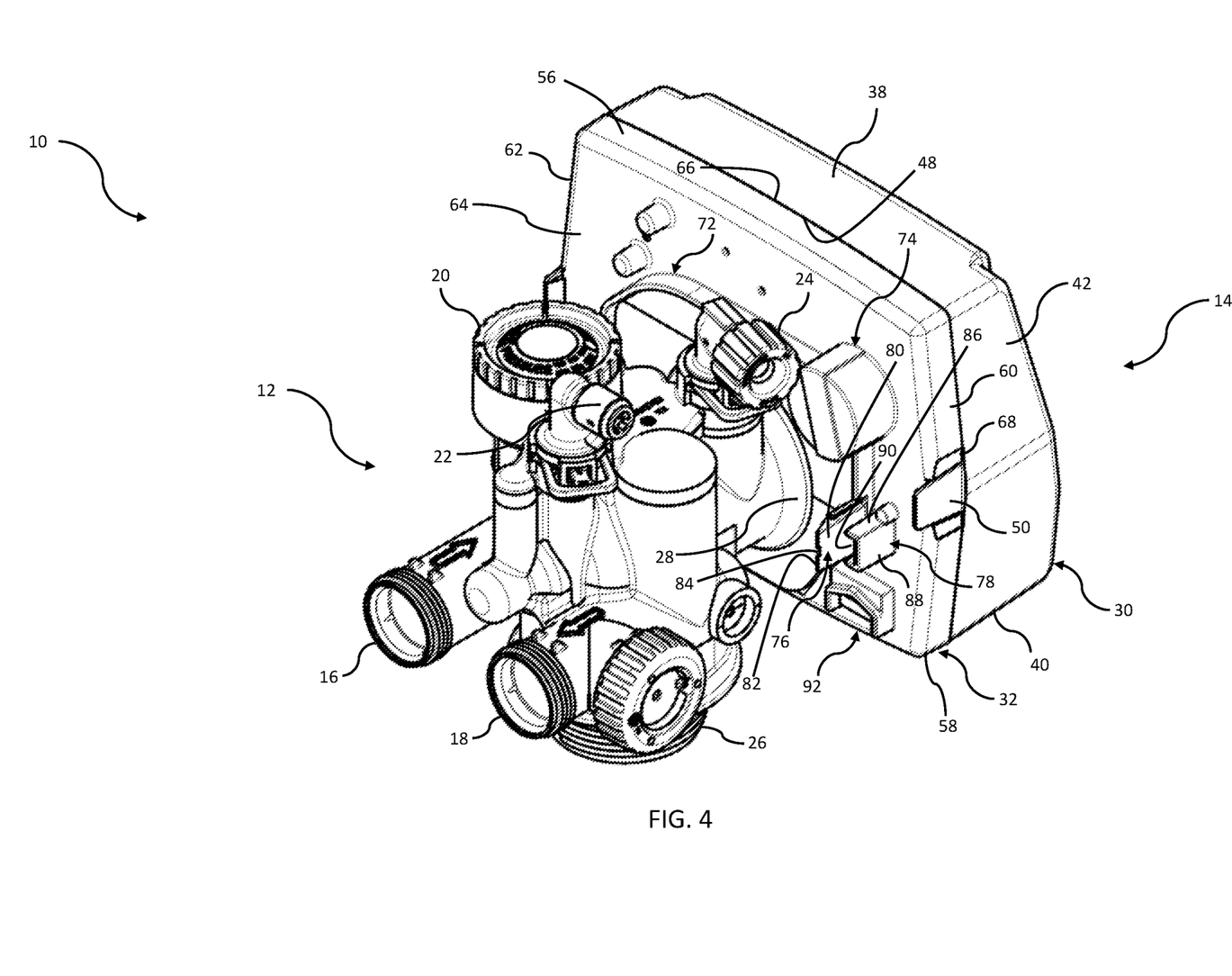
FIG. 4 is a rear, perspective view of the control valve of FIG. 1.

As is best shown in FIG. 4, the rear housing 32 generally includes a top wall 56, a bottom wall 58, a first side wall 60, a second side wall 62, a rear wall 64 and a front edge 66. Each of the side walls 60, 62 includes a retaining recess 68 which mates with the retaining tabs 50 of the front housing's side walls 42, 44 as is further described herein. When the front housing 30 is connected to the rear housing 32 in the manner described herein, the rear edge 48 of the front housing 30 mates with or engages the front edge 66 of the rear housing 32 to form a substantially enclosed volume.

The rear wall 64 of the rear housing 32 include a central opening 70 (FIG. 5A), a mating wall 72, a gear box housing 74, connection snaps 76, and over-extension walls 78. The central opening 70 facilitates engagement between a control gear 140 and a drive gear 172 as is further described below. The mating wall 72 is positioned adjacent an upper edge 120 of a front wall 118 of the mounting flange 28 of the valve body 12 as is further described below. The gear box housing 74 receives a gear box 136 that rotates the gears 140, 172 to produce movement of a piston 170 that configures the valve body 12 for the various cycles included in operation of the water softener as is also further described below.

The connection snaps 76 generally include a body 80 which protrudes substantially perpendicularly from the rear wall 64, a cam 82 (FIG. 5A) formed on the inward surface of the body 80, a catch surface 83 at the inner intersection between the body 80 and the cam 82, and a groove 84 that extends through the cam 82, the catch surface 83 and the inner surface of the body 80. The groove 84 mates with a ridge 128 formed in mounting tabs 122 of the mounting flange 28 as is further described below. While the connection snaps 76 are described herein as including grooves 84 and the mounting tabs 122 are described as including ridges 128, it should be understood that in alternative embodiments the connection snaps 76 could include ridges and the mounting tabs 122 could include grooves. Additionally, other cooperating surfaces are contemplated by the present disclosure, and more than one such set of cooperating surfaces could be used. Collectively, the cooperating surfaces (including the grooves 84 and the ridges 128) may be referred to as alignment guide elements. Moreover, it is contemplated that the connection snaps 76 and mounting tabs 122 may be replaced with other complementary mating structures in alternative embodiments. In other words, rather than using snaps on the controller 14 that flex and catch onto mounting tabs 122 on the valve body 12, those components could not only be reversed, but could be replaced by other mating structures such as clasp latches, a detent and recess combination, magnets, etc. These various types of connection structures are collectively referred to herein as retention elements.

As best shown in FIG. 4, the over-extension walls 78 each include a pair of side walls 86, an outer wall 88 extending between the side walls 86, and a recess 90 formed by the side walls 86 and the outer wall 88. The over-extension walls 78 extend substantially perpendicularly from the rear wall 64 and are positioned adjacent the connection snaps 76 to provide a stop that prevents over extension of the snaps 76 when they are flexed to engage and disengage the mounting tabs 122 of the mounting flange 28 as is further described below. The rear wall 64 further includes wiring openings 92 which receive wires for electrical connections to power and other devices as is further described below. In one embodiment, the wiring openings 92 are filled with foam, which permits the wires to be routed through the openings 92 but impedes ingress of water or other fluids.

Figure 6:
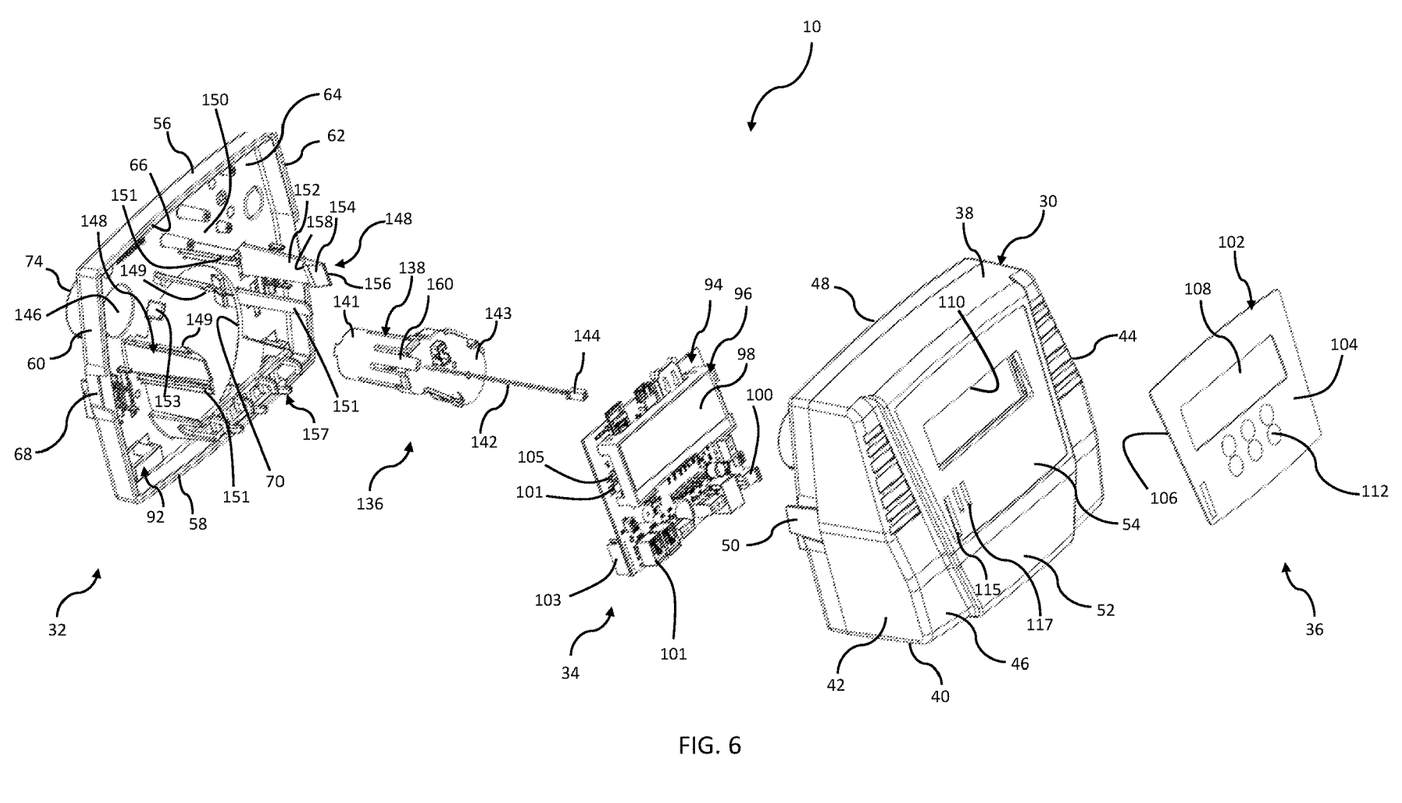
FIG. 6 is a perspective, exploded view of components of the controller according to one embodiment of the present disclosure.

Referring now to FIG. 6, the circuit board assembly 34 generally includes a printed circuit board ("PCB") 94 on which is mounted a plurality of connectors generally designated and a display assembly 96 including a display 98. The plurality of connectors includes a power connector 100, a flow meter connector 101, a ribbon cable connector 103, and a gear box connector 105. The power connector 100 is configured to receive a mating connector from a power source. The flow meter connector 101 is configured to receive a mating connector of a cable connected to the flow meter (not shown). The ribbon cable connector 103 is configured to receive a connector on a ribbon cable (not shown) that extends from the membrane switch assembly 36 as is further described below. The gear box connector 105 is configured to receive the connector 144 of the motor cable 142 from the gear box 136. A plurality of additional electrical components are mounted to the PCB 94 to enable the functions described herein, but are not described to simplify this description.

Figure 1:
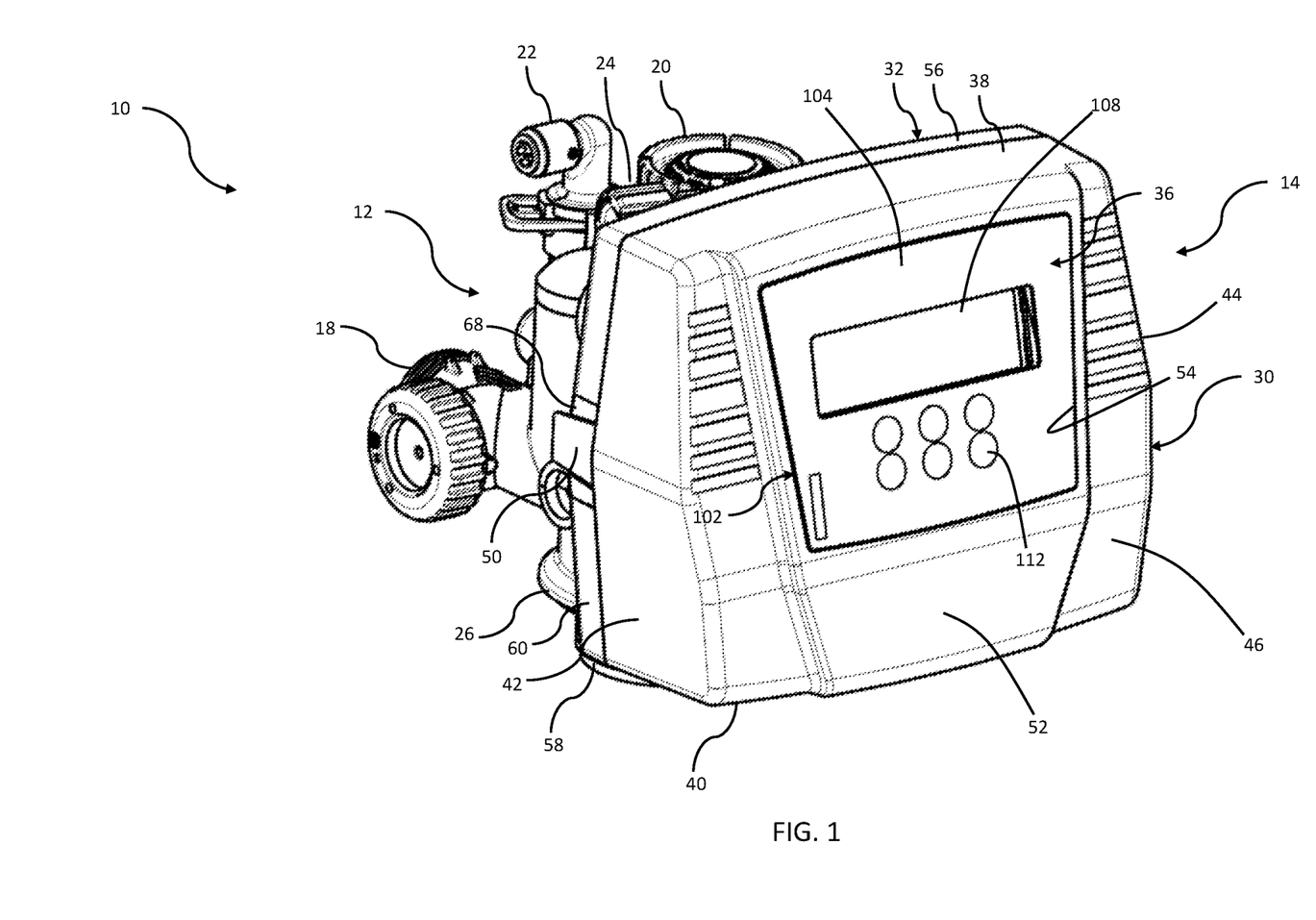
FIG. 1 is a front, perspective view of a control head according to one embodiment of the present disclosure.
Figure 2:
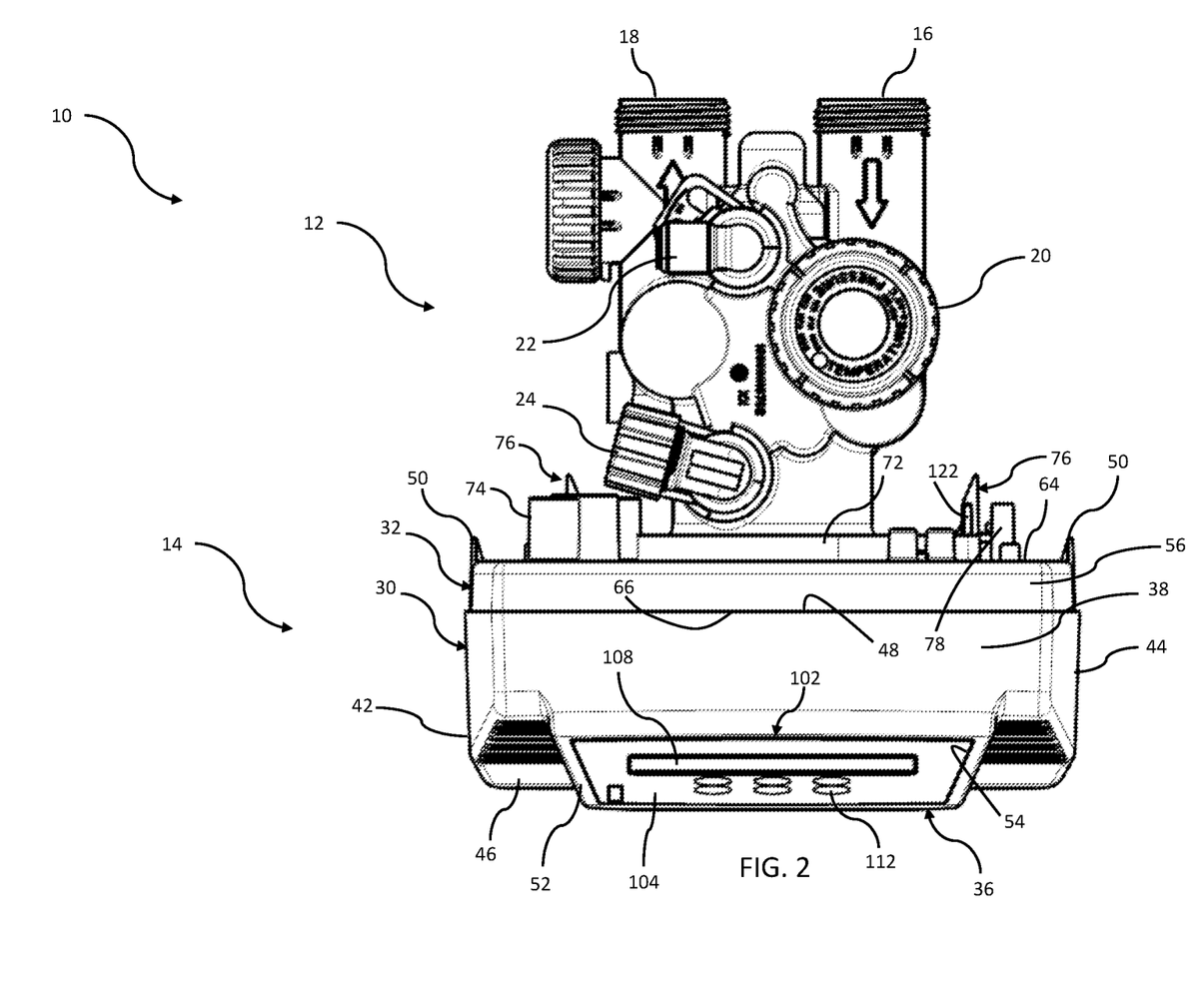
FIG. 2 is a top view of the control valve of FIG. 1.
Figure 3:
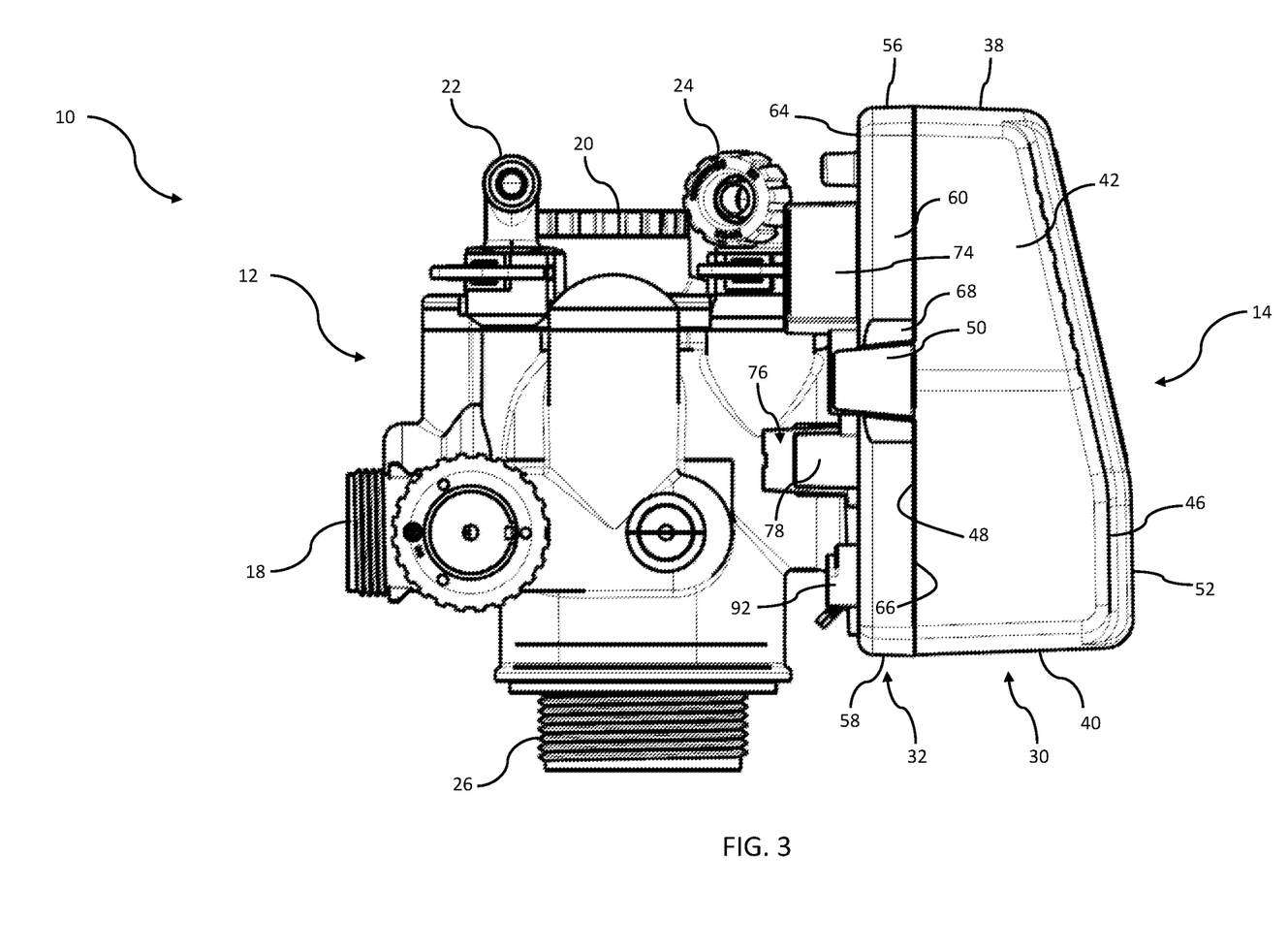
FIG. 3 is a side view of the control valve of FIG. 1.

Referring to FIGS. 1 and 6, the membrane switch assembly 36 includes a body 102 with a front surface 104 and a rear surface 106. In certain embodiments, the rear surface 106 includes an adhesive (not shown) for securing the membrane switch assembly 36 to the switch recess 54 of the front wall 46 of the front housing 30. The body 102 further includes a transparent portion 108 which is positioned to align with an opening 110 in the switch recess 54, which is also aligned with the display 98 of the circuit board assembly 34. The body 102 also includes internal switches (not shown) which are aligned with buttons 112 formed on the body 102 such that when a user presses a button 112 a corresponding internal switch is activated. Internal conductors route electrical signals from the internal switches to a ribbon cable (not shown). The ribbon cable (not shown) extends from the body 102 and is passed through a ribbon cable opening 115 through the switch recess 54 to connect to the circuit board assembly 34. The openings 117 through the switch recess 54 are used to mold a catch (not shown) on the inside of the switch recess 54. The catch receives a tether (not shown) which is also connected to the rear housing 32 to prevent damage to the ribbon cable (over extension) when the front housing 30 is removed. The tether also allows the front housing 30 to hang from the rear housing 32 during servicing and/or troubleshooting the controller 14.

Figure 5A:
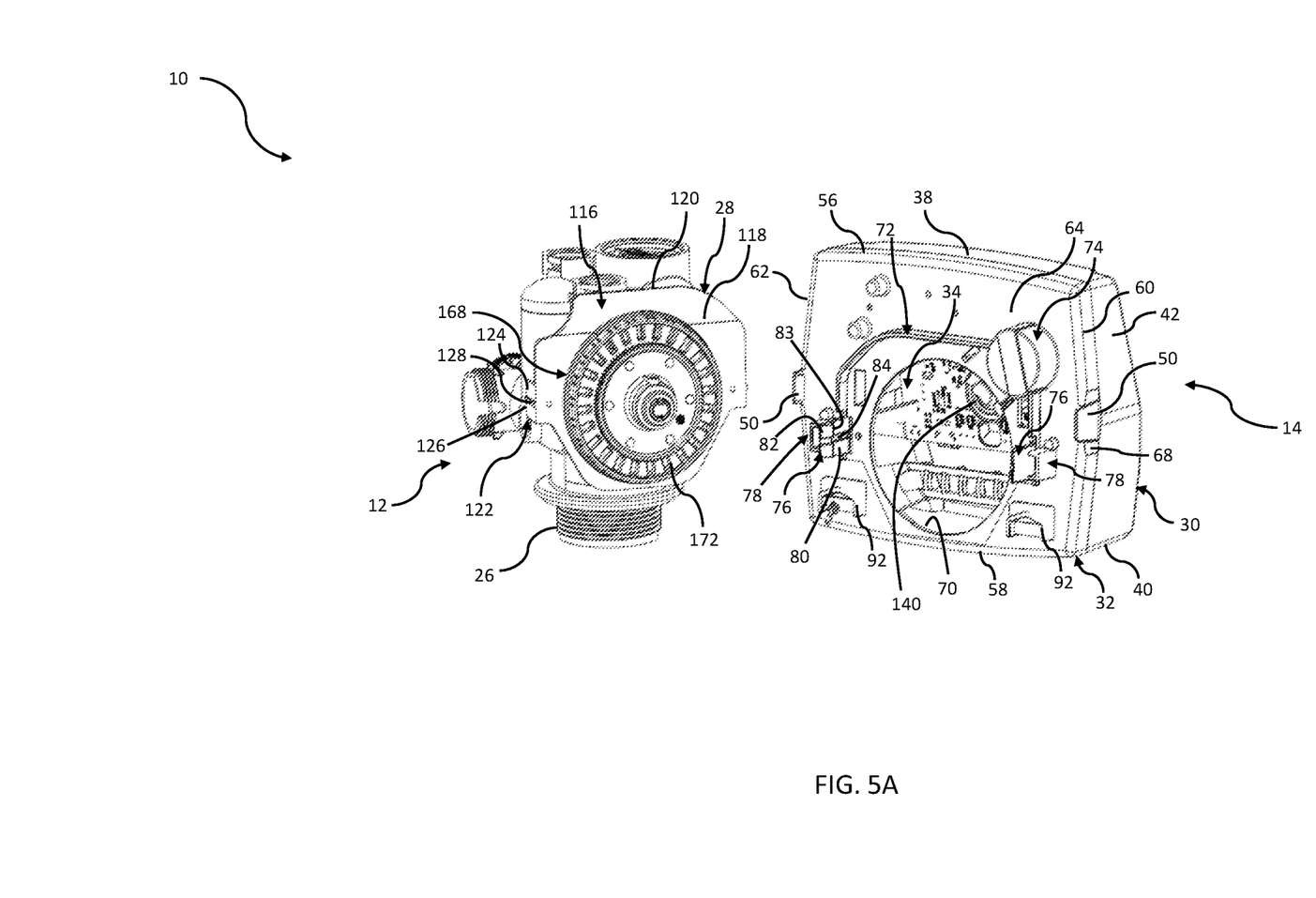
FIG. 5A is a perspective view of the control valve of FIG. 1 with the controller detached from the valve body.
Figure 5B:
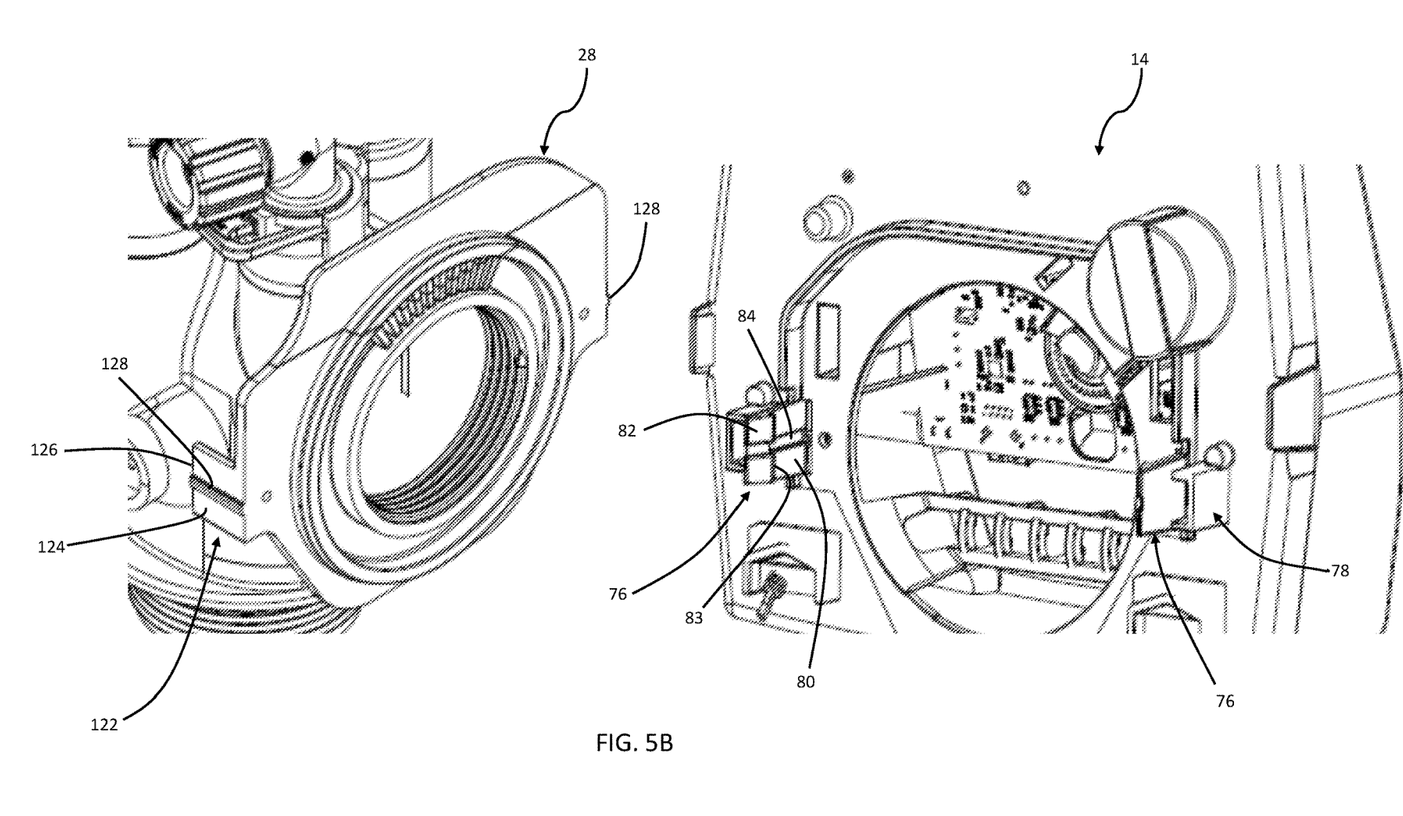
FIG. 5B is an enlarged perspective view of the control valve of FIG. 1 with the controller detached from the valve body.
Figure 7:
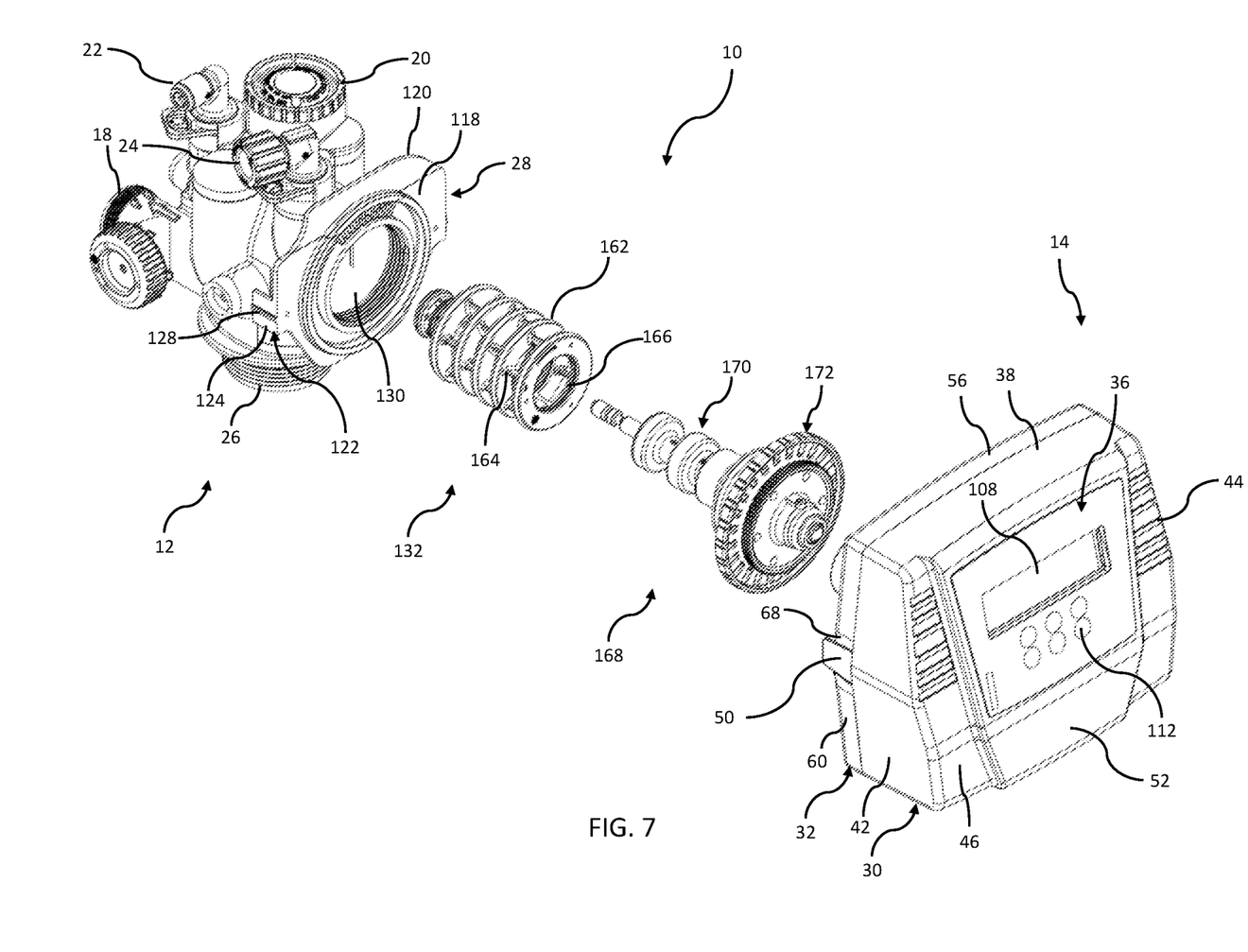
FIG. 7 is a front, perspective, exploded view of component of the valve body and controller according to one embodiment of the present disclosure.

Referring now to FIG. 5A, the valve body 12 is depicted substantially assembled with the controller 14 detached. The mounting flange 28 of the valve body 12 is, in one embodiment, integrally formed as part of the valve body 12. In another embodiment, the mounting flange 28 is configured to be attached to one or more different types of control valves 12 as a retrofit component. The mounting flange 28 includes a body 116 having a front wall 118. An upper edge 120 of the front wall 118 is configured to mate with the mating wall 72 of the rear housing 32 of the controller 14. A pair of mounting tabs 122 extend rearwardly in substantially perpendicular relation to the front wall 118. The mounting tabs 122 include a side wall 124 and a rear edge 126. A ridge 128 is formed in the side wall 124 and extends from the front wall 118 of the mounting flange 28 to the rear edge 126 of the side wall 124. The ridges 128 are positioned to be received in the grooves 84 on the inner surface of the body 80 of the connection snaps 76 when the controller 14 is mounted to the mounting flange 28. As best shown in FIG. 7, the mounting flange 28 also includes a central opening 130 which is configured to receive the seal stack 132 and the gear piston assembly 168 as is further described below.

Referring again to FIG. 6, the gear box 136 is shown removed from the gear box housing 74 of the rear housing 32 of the controller 14. The gear box 136 generally includes a cylindrical housing 138 that houses a motor (not shown) which rotates the control gear 140 (FIG. 8) disposed in the controller 14. The gear box 136 also includes a motor cable 142 with a connector 144 on one end that connects to the gear box connector 105 on the PCB 94 to receive power and control signals from the controller 14. The cylindrical housing 138 is sized to be received within an opening 146 of the gear box housing 74. The cylindrical housing 138 also includes a plurality of retention prongs 160 which retain the lower portion 141 of the housing 138 to the upper portion 143 of the housing 138.

FIG. 6 also shows a pair of support arms 148 extending outwardly from the inner surface 150 of the rear housing 32 and a plurality of standoffs 151. The support arms 148 include an elongated body 152 and a cam 154 at the outer end 156 of the elongated body 152 that forms a catch 158. Note that FIG. 6 shows the rear housing 32 both attached to the front housing 30 and detached (left hand side) from the rear housing 32. Together the support arms 148 and the standoffs 151 provide a mounting structure for the circuit board assembly 34. More specifically, the PCB 94 is moved laterally toward the rear wall 64 of the rear housing 32 to engage the cams 154 of the support arms 148 and flex the support arms 148 away from one another. When the PCB 94 is moved far enough, the PCB 94 will rest on the standoffs 151 and the support arms 148 will return to their unflexed state such that the catches 158 of the support arms 148 retain the PCB 94 in place. FIG. 6 also shows a pair of retention prongs 149 and an anti-rotation tab 153 which hold the gearbox 136 in place in the opening 146 of the gear box housing 74. The gear box housing 74 support the gear box 136 against lateral and reward motion, the anti-rotation tab 153 supports the gearbox 136 against lateral and rearward motion as well as rotation. The retention prongs 149 retain the gear box 136 in rear housing 32. Finally, FIG. 6 also shows a wire routing feature 157 which is used to route and retain the power cord and flow meter cable within the controller 14.

Figure 8:
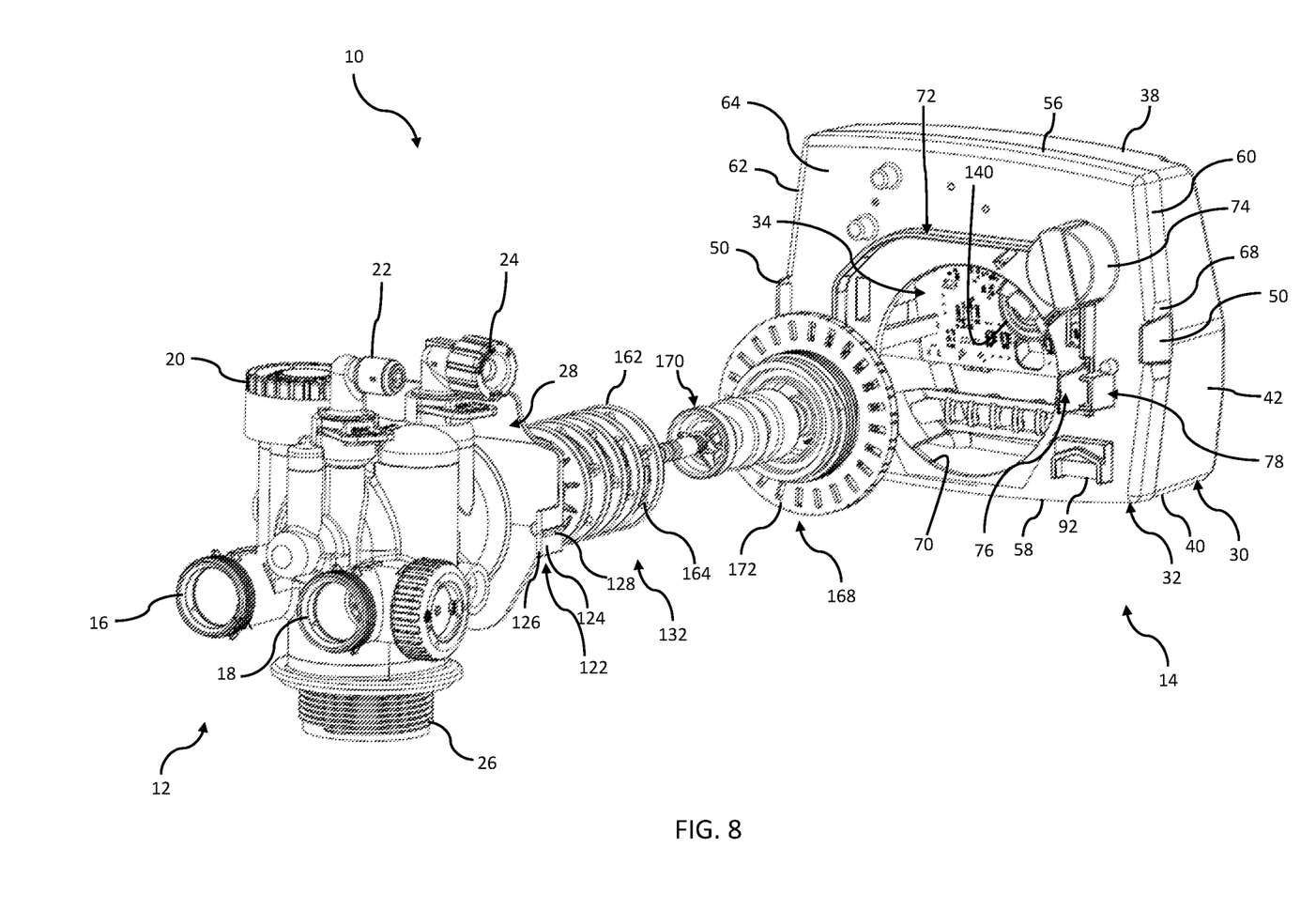
FIG. 8 is a rear, perspective, exploded view of component of the valve body and controller according to one embodiment of the present disclosure.

As shown in FIGS. 5, 7 and 8, the seal stack 132 of the valve body 12 includes a plurality of disks 162 connected to one another by a plurality of circumferentially spaced apart wall portions 164. A central bore 166 extends through the disks 162 and is configured to receive the piston 170 of the gear piston assembly 168. The disks 162 are sized to be received through the central opening 130 of the mounting flange 28 into a central bore (not shown) in the valve body 12. The gear piston assembly 168 includes a drive gear 172 coupled to the piston 170. When the controller 14 is attached to the mounting flange 28 of the valve body 12, the drive gear 172 is engaged by the control gear 140 (FIG. 8) which is driven by the gear box 136 under the control of the electronics on the PCB 94. As is known in the art, rotation of the drive gear 172 causes longitudinal movement of the piston 170 in the central bore 166 of the seal stack 132. Depending upon the position of the piston 170 in the seal stack 132, various flow passageways are opened and/or closed to the fluid inlet 16, the fluid outlet 18, the injector assembly 20, the brine port 22, the drain 24 and the tank connection 26 to permit the water softener to operate in one of the various operation modes (e.g., service, backwash, rinse, and regeneration).

Referring again to FIG. 6, the controller 14 is assembled by passing the ribbon cable (not shown) of the membrane switch assembly 36 through the ribbon opening 115 in the switch recess 54 of the front wall 46 of the front housing 30. The body 102 of the membrane switch assembly 36 may then be affixed to the switch recess 54, aligning the transparent portion 108 with the opening 110 of the switch recess 54. A connector on the ribbon cable (not shown) is connected to the ribbon cable connector 103 on the PCB 94. The connector 144 of the gear box 136 is connected to the gear box corresponding connector 105 on the PCB 94 and the gear box 136 is installed in the gear box housing 74 of the rear housing 32. At this point, the front housing 30 may be connected to the rear housing 32 by snapping the retaining tabs 50 of the front housing 30 over the retaining recesses 68 of the rear housing 32, thereby bringing together the rear edge 48 of the front housing 30 and the front edge 66 of the rear housing 32 to form a substantially water-tight seal.

As indicated above, a feature of the present disclosure is the ease, safety and speed with which the seal stack 132 may be replaced during routine maintenance. As indicated, the movement of the piston 170 within the central bore 166 of the seal stack 132 along with contaminants in the water causes wear over time, requiring replacement of the seal stack 132. In certain conventional control head designs, seal stack replacement is a time-consuming process that may result in damage to components of the controller. Normally, the seal stack is replaced by removing a face plate of the controller to expose the PCB. The power connector and the flow meter connector are disconnected from the PCB. The PCB assembly is then removed by unclipping its supporting bracket from retention tabs extending from the body of the control valve. This leaves the PCB assembly exposed to the environment during seal stack replacement, which in some instances can result in damage to the controller components or to the PCB. After the PCB assembly is disconnected from the retention tabs, the gear piston assembly must be unscrewed from control valve, typically using a special tool. Once unscrewed, the gear piston assembly and seal stack may be removed. A new seal stack is then installed into the control valve and the process is reversed. One potential problem that may occur during reassembly is miswiring or damage to connectors as many of the connections are physically interchangeable. In the event that the controller is in need of replacement, the above steps are followed with the addition of disengagement of the retention tabs between the body of the control valve and the controller body. In some instances, the retention tabs are broken, which requires the replacement of the entire control valve.

Replacement of the seal stack 132 for a water softener using a controller 14 according to the present disclosure is much simpler, faster, and less likely to cause damage to components of the controller 14. First, the connector of the cable from the flow meter to the PCB 94 is disconnected at the flow meter (not shown) on the valve body 12. Then, the connection snaps 76 are flexed away from one another to disengage from the mounting tabs 122 of the mounting flange 28, and the controller 14 is removed from the mounting flange 28. It should be noted that the power cord to the controller 14 may need to be unplugged from the wall if the controller 14 is moved beyond the length of the power cord. At this point, the gear piston assembly 168 and the seal stack 132 are removed in a conventional manner. After the seal stack 132 is replaced and the gear piston assembly 168 is screwed onto the mounting flange 28, the controller 14 is simply pushed onto the mounting flange 28 such that the connection snaps 76 snap over the mounting tabs 122 to secure the controller 14 in place. Finally, the flow meter is reconnected.

More specifically, as the controller 14 is pushed onto the mounting flange 28, the cams 82 of the connection snaps 76 engage the front wall 118 of the mounting flange 28, causing the connection snaps 76 to flex outwardly (i.e., away from one another) from an unflexed state to a flexed state as the snaps 76 move farther over the side walls 124 of the mounting tabs 122. When the catch surfaces 83 of the connection snaps 76 reach the rear edges 126 of the mounting tabs 122, the connection snaps 76 snap back to their original unflexed state. Engagement between the catch surfaces 83 of the connection snaps 76 and the rear edges 126 of the mounting tabs 122 retains the controller 14 in place. The grooves 84 on the connection snaps 76 and the mating ridges 128 on the mounting tabs 122 provide vertical alignment guides for positioning the controller 14 when engaging it with the mounting flange 28. The flow meter is reconnected and the process is complete.

Figure 9:
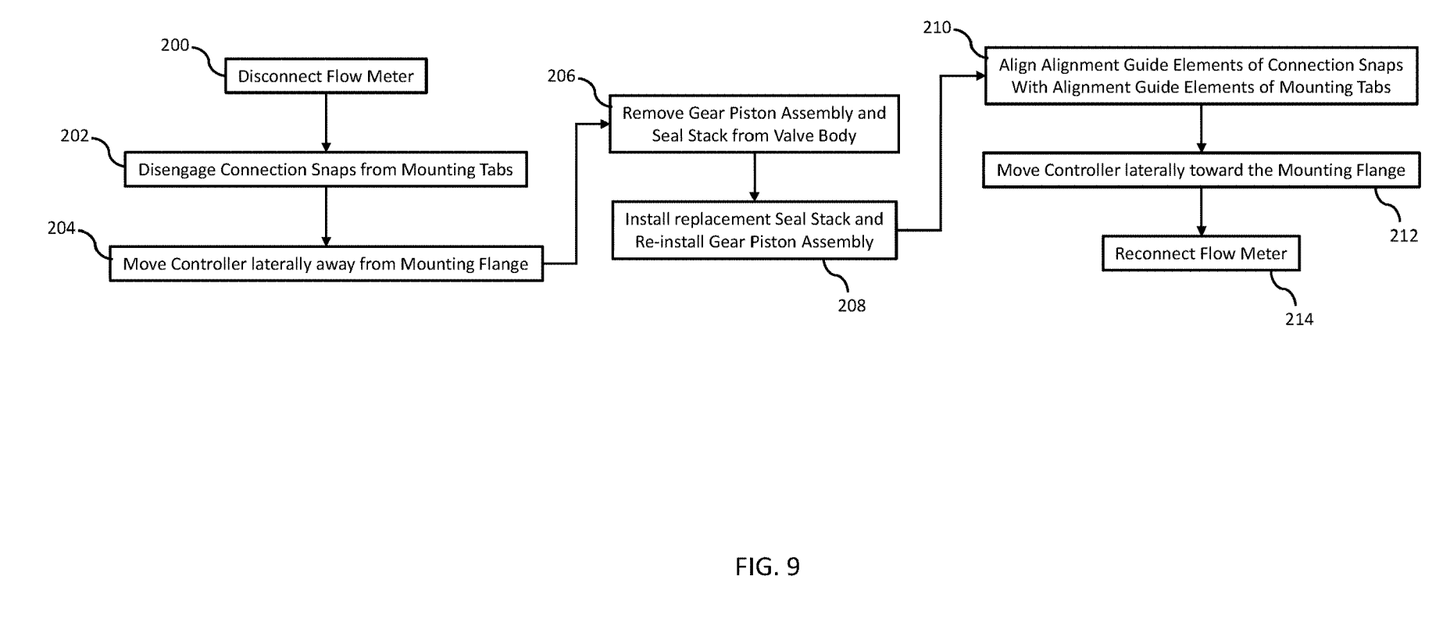
FIG. 9 is a flow chart of a method of replacing a seal stack according to one embodiment of the present disclosure.

A method of replacing a seal stack 132 of a valve body 12 according to one embodiment of the present disclosure is depicted in the flow chart of FIG. 9. As shown, at step 200 the flow meter of the valve body 12 is disconnected. At step 202, the connection snaps 76 are flexed away from one another to disengage from the mounting tabs 122 of the mounting flange 28. At step 204, the controller 14 is moved laterally away from the mounting flange 28 to disengage from the valve body 12. At step 206, the gear piston assembly 168 and the seal stack 132 are removed from the valve body 12. At step 208, a replacement seal stack 132 is installed in the valve body 12 and the gear piston assembly 168 is re-installed into the valve body 12. At step 210, the controller 14 is positioned onto the mounting flange 28 by aligning the alignment guide elements of the connection snaps 76 (i.e., the grooves 84) with the alignment guide elements of the mounting tabs 122 (i.e., the ridges 128). At step 212, the controller 14 is moved laterally toward the mounting flange 28 causing the connection snaps 76 to flex away from one another to a flexed state until the catch surfaces 83 of the connection snaps 76 pass the rear edges 126 of the mounting tabs 122, when the connection snaps 76 return to the unflexed state and retain the controller 14 on the mounting flange 28. At step 214, the flow meter is reconnected and the process is complete.

It should be noted that the controller 14 may be replaced following the steps described herein, while omitting the steps 206, 208 relating to removal and replacement of the seal stack 132. In other words, the flow meter is disconnected (step 200), the connection snaps 76 of the controller 14 are disengaged from the mounting tabs 122 (step 202), the controller 14 is moved laterally away from the mounting flange 28 (step 204), and the controller 14 is replaced with a replacement controller 14. Of course, the power cord to the controller 14 needs to be unplugged from the power connector 100 by removing the front housing 30. Then, the connection snaps 76 of the replacement controller 14 are aligned with the mounting tabs 122 (step 210), the controller 14 is moved laterally toward the mounting flange 28 to connect the controller 14 to the mounting flange 28, and the flow meter and power cord are reconnected. This process permits replacement of the controller 14 with virtually zero risk of damage to the valve body 12.

Any directional references used with respect to any of the figures, such as right or left, up or down, or top or bottom, are intended for convenience of description, and do not limit the present disclosure or any of its components to any particular positional or spatial orientation. Additionally, any reference to rotation in a clockwise direction or a counter-clockwise direction is simply illustrative. Any such rotation may be implemented in the reverse direction as that described herein.

Although the foregoing text sets forth a detailed description of embodiments of the disclosure, it should be understood that the legal scope of the invention is defined by the words of the claims set forth at the end of this patent and equivalents. The detailed description is to be construed as exemplary only and does not describe every possible embodiment. Numerous alternative embodiments may be implemented, using either current technology or technology developed after the filing date of this patent, which would still fall within the scope of the claims.

The following additional considerations apply to the foregoing description. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at various times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single device or geographic location (e.g., within a home environment, an office environment, or a server farm). In other example embodiments, the one or more processors or processor-implemented modules may be distributed across a number of devices or geographic locations.

Unless specifically stated otherwise, use herein of words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Additionally, some embodiments may be described using the expression "communicatively coupled," which may mean (a) integrated into a single housing, (b) coupled using wires, or (c) coupled wirelessly (i.e., passing data/commands back and forth wirelessly) in various embodiments.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed is:

1. A controller for a fluid treatment control valve having a valve body with a seal stack positioned therein, the controller comprising:
   a front housing;
   a rear housing removably connected to the front housing to define a substantially enclosed volume;
   a gear box mounted within the substantially enclosed volume; and a circuit board assembly mounted within the substantially enclosed volume;
wherein the rear housing includes at least one first retention element and the valve body includes at least one second retention element; and
wherein the controller is removable from the valve body while the rear housing is connected to the front housing by disengaging the at least one first retention element from the at least one second retention element.

2. The controller of claim 1, wherein the rear housing further includes a central opening sized to receive a drive gear of the valve body.

3. The controller of claim 2, further comprising a control gear driven by the gear box and configured to engage the drive gear when the controller is mounted to the valve body.

4. The controller of claim 1, wherein the at least one first retention element includes a pair of connection snaps, and the at least one second retention element includes a pair of mounting tabs.

5. The controller of claim 4, wherein each connection snap includes a body that extends substantially perpendicularly from a rear wall of the rear housing, a cam configured to engage one of the pair of mounting tabs to cause the connection snap to flex from an unflexed state to a flexed state, and a catch surface that engages a rear edge of the one of the pair of mounting tabs when the controller is mounted to the valve body and the connection snap moves to the unflexed state.

6. The controller of claim 4, wherein each connection snap includes a first alignment guide element and each mounting tab includes a second alignment guide element that mates with the first alignment guide element.

7. The controller of claim 6, wherein the first alignment guide element is a groove and the second alignment guide element is a ridge.

8. The controller of claim 4, wherein the rear housing further includes a pair of over-extension walls positioned adjacent the pair of connection snaps, each over-extension wall providing a stop that prevents the adjacent connection snap from over-extending.

9. The controller of claim 1, further comprising a membrane switch assembly including a body with a plurality of buttons, the front housing including a switch recess sized to receive the body of the membrane switch assembly.

10. The controller of claim 9, wherein the circuit board assembly includes a display mounted to a printed circuit board, the display being visible through an opening in the switch recess and a transparent portion of the body of the membrane switch assembly.

11. The controller of claim 1, wherein the rear housing includes a gear box housing configured to receive the gear box.

12. The controller of claim 1, wherein the front housing includes a rear edge and a pair of retaining tabs and the rear housing includes a front edge and a pair of retaining recesses, the front housing being connected to the rear housing by placing the pair of retaining tabs into the pair of retaining recesses, thereby positioning the rear edge of the front housing into engagement with the front edge of the rear housing.

13. A control valve for a fluid treatment system, comprising:
a valve body with a seal stack and a gear piston assembly positioned therein, the valve body having a mounting flange with a pair of mounting tabs; and
a controller including a circuit board assembly and a gear box for controlling operation of the gear piston assembly to move a piston of the gear piston assembly within the seal stack, the circuit board assembly and the gear box being housed within a housing of the controller, the housing including a pair of connection snaps positioned to align with the mounting tabs;
wherein the controller is removable from the valve body by flexing the connection snaps away from one another to disengage the connection snaps from the mounting tabs, thereby exposing the gear piston assembly to facilitate replacement of the seal stack.

14. The control valve of claim 13, wherein the housing includes a front housing and a rear housing, the connection snaps extending rearwardly from the rear housing.

15. The control valve of claim 14, wherein the rear housing includes a central opening sized to receive a drive gear of the gear piston assembly.

16. The control valve of claim 15, wherein the controller further includes a control gear driven by the gear box and configured to engage the drive gear when the controller is mounted to the valve body.

17. The control valve of claim 13, wherein each connection snap includes a body that extends substantially perpendicularly from a rear wall of the housing, a cam configured to engage one of the pair of mounting tabs to cause the connection snap to flex from an unflexed state to a flexed state, and a catch surface that engages a rear edge of the one of the pair of mounting tabs when the controller is mounted to the valve body and the connection snap moves to the unflexed state.

18. The control valve of claim 13, wherein each connection snap includes a first alignment guide element and each mounting tab includes a second alignment guide element that mates with the first alignment guide element.

19. The control valve of claim 18, wherein the first alignment guide element is a groove and the second alignment guide element is a ridge.

20. The control valve of claim 13, wherein the housing further includes a pair of over-extension walls positioned adjacent the pair of connection snaps, each over-extension wall providing a stop that prevents the adjacent connection snap from over-extending.

21. The control valve of claim 13, wherein the controller further includes a membrane switch assembly including a body with a plurality of buttons and the housing includes a switch recess sized to receive the body of the membrane switch assembly.

22. The control valve of claim 21, wherein the circuit board assembly includes a display mounted to a printed circuit board, the display being visible through an opening in the switch recess and a transparent portion of the body of the membrane switch assembly.

23. The control valve of claim 13, wherein the housing includes a front housing coupled to a rear housing, the front housing including a rear edge and a pair of retaining tabs and the rear housing including a front edge and a pair of retaining recesses, the front housing being connected to the rear housing by placing the pair of retaining tabs into the pair of retaining recesses, thereby positioning the rear edge of the front housing into engagement with the front edge of the rear housing.

24. A method of replacing a seal stack of a water treatment system including a valve body, a controller, a flow meter, and a gear piston assembly, the method comprising:
disconnecting the flow meter;
disengaging connection snaps on a housing of the controller from mounting tabs on a mounting flange of the valve body, the housing substantially enclosing a gear box and a circuit board assembly;

moving the controller, with the gear box and the circuit board assembly substantially enclosed within the housing, laterally away from the mounting flange;

removing the gear piston assembly and the seal stack from the valve body;

installing a replacement seal stack in the valve body and re-installing the gear piston assembly;

aligning alignment guide elements of the connection snaps with alignment guide elements of the mounting tabs;

moving the controller laterally toward the mounting flange; and reconnecting the flow meter.

25. The controller of claim 1, wherein the at least one first retention element is configured to mate with the corresponding at least one second retention element without requiring rotation of the rear housing.

26. The method of claim 24, wherein disengaging connection snaps on the housing of the controller from mounting tabs on the mounting flange of the valve body includes flexing the connection snaps.

* * * * *